(12) United States Patent
French et al.

(10) Patent No.: US 7,047,234 B2
(45) Date of Patent: May 16, 2006

(54) SYSTEM AND METHOD FOR MANAGING DATABASE ACCESS

(75) Inventors: Ronal Richard French, Oronoco, MN (US); Brian Richard Lepel, Rochester, MN (US); Randy Eugenio Oyarzabal, Kasson, MN (US); Susan Eileen Skrabanek, Stone Mountain, GA (US); Nathan G. Steffenhagen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 10/025,390

(22) Filed: Dec. 19, 2001

(65) Prior Publication Data

US 2003/0115205 A1   Jun. 19, 2003

(51) Int. Cl.
*G06F 17/30* (2006.01)
(52) U.S. Cl. .................. 707/3; 707/2; 707/7; 707/8; 707/9; 707/10
(58) Field of Classification Search .............. 707/1–10, 707/100–104.4, 200–206
See application file for complete search history.

(56) References Cited

U.S. PATENT DOCUMENTS

| 5,675,782 | A | * | 10/1997 | Montague et al. | ............ 707/10 |
| 6,085,191 | A | * | 7/2000 | Fisher et al. | ................... 707/9 |
| 6,275,825 | B1 | * | 8/2001 | Kobayashi et al. | ............ 707/9 |
| 6,393,477 | B1 | * | 5/2002 | Paxhia et al. | ............... 709/223 |

* cited by examiner

*Primary Examiner*—Jean M. Corrielus
*Assistant Examiner*—Isaac M. Woo
(74) *Attorney, Agent, or Firm*—Patterson & Sheridan, LLP

(57) ABSTRACT

Method and apparatus for managing user access to bx;1database(s), thereby reducing the time-consuming, repetitive tasks a database administrator must perform to grant user access to one or more databases. Embodiments of the invention also facilitate a database administrator in granting multiple user access of different types to multiple databases. Furthermore, embodiments of the invention provide systems and methods for tracking grants of user access for multiple databases. One embodiment provides a method for managing user access to one or more databases, comprising: receiving an access request for one or more users requesting access to one or more databases; retrieving server information for the one or more databases; adding the one or more users to a user group for the database; and generating an access document for each user.

23 Claims, 6 Drawing Sheets

Access Request 4 - Lotus Notes

ADDRESS

Access Request

Created by James A. Hoppa/Rochester/IBM on 07/16/2001 11:55:44 AM
Status New
Required fields are marked with an asterisk (*) and must be filled in to complete the form.

* Names

Peter Morelli/Southbury/IBM@IBMUS
Sheila J Mobley/Raleigh/IBM/IBM@IBMUS
Simone Dick/ Australia/IBM@IBMAU
Ken Ullery/Raleigh/Contr/IBM@IBMUS
I Nyoman Parkaraharja/Indonesia/IBM@IBMIN
Mitsuharu Maeda/Japan/IBM@IBMJ
Reynaldo Ruiz/Southbury/IBM@IBMUS
Blake Cunningham/Bethesda/IBM@IBMUS
Bob Montague/Raleigh/Contr/IBM@IBMUS
Brian Murray/Raleigh/IBM@IBMUS

— 330

310

* No domains menas @IBMUS
* Application(s)   ⊙ Yes   ○ No
                   UVATS Easy Access LC-User
                   UVATS Eassy Access-User Copy To   320   Martin Anastasi/Cincinati/IBM@IBMUS

| Application | Users Added to This Group |
|---|---|
| UVATS Easy Access LC-User | Shuttle6Learners3 |
| UVATS Eassy Access-User | Shuttle-UVATS-User3 |

Created by James A. Hocoa/Rochester/IBM on 07/16/2001  11:55 A.M. CDT   Last Modified 07/16/2001  11:53:47 A.M. CDT Record last 5 saves to the document.
Top is most recent.
Version                           Date                                    User

UVATS EasyAccess database - User Access - Lotus Notes

ADDRESS

Access for:
Peter Morelli/Southbury/IBM@IBMUS, Sheila J Mobly/Raleigh/IBM@IBMUS, Simone Dik/Australia/IBM@IBMAU, Ken Ullery/Raleigh/Contr/IBM@IBMUS, I Nyoman Parkaraharja/Indonesia/IBM@IBMIN, Mitsuharu Maeda/Japan/IBM@IBMJP, Reynaldo Ruiz/Southbury/IBM@IBMUS, Blake Cunningham/Bethesda/IBM@IBMUS, Bob Montague/Raleigh/Contr/IBM@IBMUS, Brian Murray/Raleigh/IBM@IBMUS Copy:
Martin Anastasi/Cincinati/IBM@IBMUS

UVATS EasyAccess Database - User Access

Access to the UVATS EassyAccess Database could take up to 24 hours after receiving this note. Please feel free to try and access the database earlier.

Please DO NOT forward this document.

This button should add a connection document, create an icon for you, and open the database.

[Open Database]

If do you wish to do this by hand:
DB Title:   UVATS EasyAccess
Server:     D01DBL90/01/A/IBM
Server IP:  9.117.250.97
Path:       u_dir/uvatss6unsf Any questions or concerns, please conact Ronal French/Rochester/IBM. Jeffrey Davis/Rochester/IBM. Brian Lepel/Rochester/IBM. Nathan G Steffenhagen/Rochester/IBM, Randy Oyarzabal/Rochester/Contr/IBM, James A Hoppa/Rochester/IBM, Rob Hoth/Rochester/IBM.

*Fig. 7*

SYSTEM AND METHOD FOR MANAGING DATABASE ACCESS

BACKGROUND OF THE INVENTION

1. Field of the Invention

The present invention generally relates to database management. More particularly, the present invention relates to management of user access to one or more databases.

2. Description of the Related Art

A database is an organized collection of data records that can be readily searched, sorted and updated. The database is often logically arranged as tables identified by table names, with columns identified by column names and rows of records. Requests against the database are made data using, for example, high-level query languages such as the Structured Query Language (SQL). Access to the database is typically managed by a software application known as a database management system (DBMS).

In order to gain access to a network database, a new user must first request authorization. Processing new user access requests for databases through conventional means is a tedious and time consuming process. A user may send the database administrator a note requesting access to particular databases, and the database administrator typically processes the request through a series of manual tasks. In a typical process, a database administrator must perform many repetitive and time-consuming database tasks to grant access to a plurality of users. First, the database administrator adds the users to appropriate access lists in a separate database. The database administrator may need to create and/or edit more than one access list per user. Second, the database administrator may need to create user/member profiles in the target database. Third, the database administrator may need to create and/or edit more than one user/member profile document per user for each application or database. Fourth, the database administrator creates an access button to automate creation of a connection document for each user. The connection document includes the necessary information for the user to make a connection to the server containing the database. Next, the database administrator creates an instructional access note which explains to the user the procedure for accessing the database. Lastly, the database administrator responds to the user (e.g., via email) and attaches the access button and the explanatory material pertaining to the database.

The database administrator may be required to manually open multiple databases and create new records or modify existing records for each individual new user. Typically, processing of each individual request may require 15 minutes to an hour, and the process may become very costly when a large number of new users require access. Furthermore, the time required to process access requests is multiplied when the users request access to multiple databases.

Therefore, there is a need for a system for managing user access to database(s) which reduces the time-consuming, repetitive tasks a database administrator must perform to grant user access to one or more databases. Furthermore, there is a need for a system which facilitates a database administrator's efforts to grant multiple user access of different types to multiple databases. Also, there is a need for a system which tracks grants of user access for multiple databases.

SUMMARY OF THE INVENTION

Embodiments of the invention generally provide method and apparatus for managing user access to database(s) which significantly reduces the time-consuming, repetitive tasks a database administrator must perform to grant user access to one or more databases. Embodiments of the invention also facilitate a database administrator's efforts to grant multiple user access of different types to multiple databases. Furthermore, embodiments of the invention provide systems and methods for tracking grants of user access for multiple databases.

One embodiment provides a method for managing user access to one or more databases, comprising: receiving an access request for one or more users requesting access to one or more databases; retrieving server information for the one or more databases; adding the one or more users to a user group for the database; and generating an access document for each user.

Another embodiment provides a signal bearing medium, comprising a program which, when executed by a processor, performs an operation for managing user access to one or more databases.

Another embodiment provides a system for managing user access to one or more databases, comprising: a storage device for storing one or more server definitions, one or more application definitions, one or more access definitions, one or more access requests, and one or more connection templates; and a processor configured to: receive an access request for one or more users requesting access to one or more databases; retrieve server information for the one or more databases; add the one or more users to a user group for the database; and generate an access document for each user.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 is a graphical user interface illustrating one embodiment of an access request 300.

FIG. 7 illustrates one embodiment of an access document 700.

DETAILED DESCRIPTION OF THE PREFERRED EMBODIMENT

Embodiments of the invention generally provide method and apparatus for managing user access to database(s) which significantly reduces the time-consuming, repetitive tasks a database administrator must perform to grant user access to one or more database. In one aspect, a database administrator's administration time for processing user access requests may be significantly reduced from hours to less than one minute. Embodiments of the invention also facilitate a database administrator's ability to grant multiple user access of different types to multiple databases. Furthermore, embodiments of the invention provide a system and method for tracking grants of user access for multiple databases.

One embodiment of the invention is implemented as a program product for use with a computer system such as, for example, the network environment 10 shown in FIG. 1 and described below. The program(s) of the program product defines functions of the embodiments (including the methods described below with reference to FIGS. 2 and 4–6) and can be contained on a variety of signal/bearing media. Illustrative signal/bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be implemented as part of an operating system or a specific application, component, program, module, object, or sequence of instructions. The inventive computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
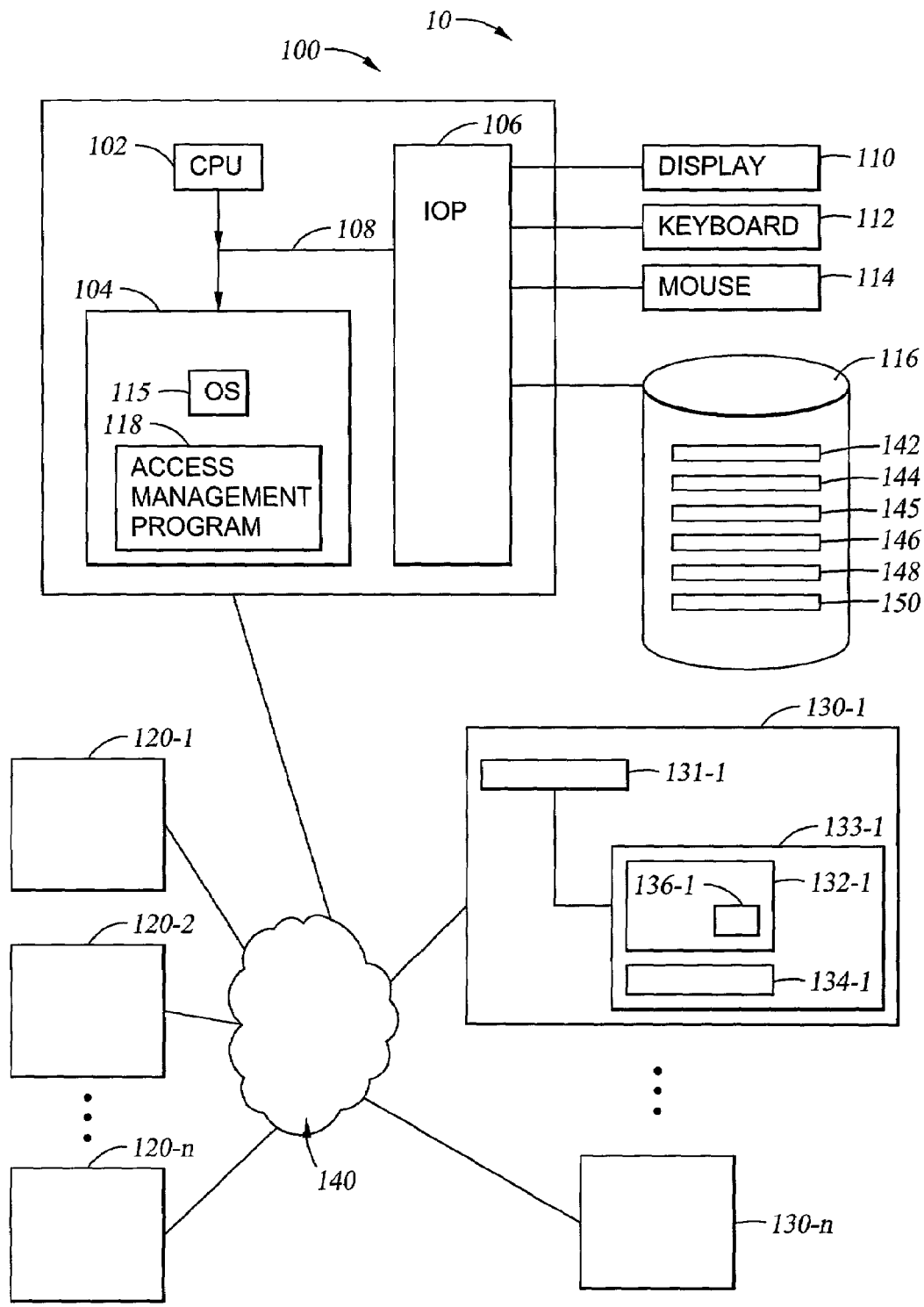
FIG. 1 is a schematic diagram illustrating one embodiment of an access management system 100 for managing user access to one or more servers 110 connected in a networked environment 10.

FIG. 1 is a schematic diagram illustrating one embodiment of an access management system 100 for managing user access to one or more servers 110 connected in a networked environment 10. As shown in FIG. 1, the networked environment 10 includes a plurality of user/client systems 120-1 to 120-n and a plurality of server systems 130-1 to 130-n connected through a network 140. The network 140 may be any local area network (LAN) or wide area network (WAN) capable of supporting the appropriate information exchange according to embodiments provided herein. In one embodiment, the network 140 is the Internet. In another embodiment, the network 140 may be a combination of LANs and WANs (e.g., a first group of the user/client systems 120-1 to 120-n being connected to one or more of the server systems 130 through a LAN while a second group of the user/client systems 120-1 to 120-n being connected to one or more of the server systems 130 through the Internet). The client systems 120-1 to 120-n and the server systems 130-1 to 130-n may be connected in communication through Transmission Control Protocol/Internet Protocol (TCP/IP) or other communication protocols.

Each of the user/client systems 120-1 to 120-n may represent an individual computer or workstation utilized by an user who is requesting access or has access to one or more of the server systems 130-1 to 130-n. Each of the server systems 130-1 to 130-n may represent a server having a processor 131-1 to 131-n and a storage device 133-1 to 133-n containing a database or an application 132-1 to 132-n to which one or more users may be requesting access or have access already. Each server system 130-1 to 130-n may include one or more name and address books (NAB) 134-1 to 134 which contains user names and/or user groups who are granted access to the server system.

An access management system 100 may be connected in communication with the user/client systems 120-1 to 120-n and the server systems 130-1 to 130-n through the network 140. Although the access management system 100 is shown as an individual system, it is contemplated that the access management system 100 may be part of a user/client system 120 or a server system 130. In one embodiment, the access management system 100 is implemented to manage user access from Lotus Notes® client systems to a plurality of Lotus Notes® databases stored in server systems 130-1 to 130-n.

The access management system 100 may comprise a computer and generally includes a central processing unit (CPU) 102, a main memory 104, and an input/output (I/O) processor 106. These system components are interconnected through a system bus 108. Input/output devices, such as a display monitor 110, a keyboard 112, and a pointing device 114 (e.g., mouse), are connected to the I/O processor 106. The access management system 100 may further include one or more storage devices 116, such as RAID systems, direct access storage devices (DASDs), tape storage devices, CD-ROM (compact disc read only memory), disk drives and other optical or magnetic storage devices, connected through the I/O processor 106. Data files, software programs, and other information may be stored in the storage devices 116.

One or more software programs, such as an operating system 115, may be stored in the main memory 104 or alternatively, in the storage devices 116. The operating system 115 may be a suitable multitasking operating system; however, those skilled in the art will appreciate that the spirit and scope of the present invention is not limited to any one operating system. The operating system 115 may support a variety of programming environments. Other software programs or application programs, such as an access management program 118, may also be stored in the main memory 104, or alternatively, in the storage devices 116. Operation of the access management system 100 may be controlled by user input through I/O devices such as the keyboard 114 and the pointing device 116.

The storage devices 116 may have several databases stored therein. Data stored in the databases may be utilized to process user access requests through the access management program 118. In one embodiment, the databases include a server definition database 142, an application definition database 144, an access type database 145, an access request database 146, a connection document database 148, and a forms database 150.

The server definition database 142 includes data for defining the servers 1301 to 130-n, including for example, the server name and the server's IP address. The application definition database 144 includes data for each application or database, such as the name, type, location, environment, and support contacts for each application or database. The access type database 145 includes data for each type of access that is available for each application or database defined in the application definition database 144. The access request database 146 includes data for each access request, including, for example, the users, the requested applications and databases, the types of access requested, the date of request, the date on which access is granted, the period (e.g., number of days) of valid access, and the date on which access is revoked. The connection document database 148 includes data for the connection documents required for the users to make the connection and access the applications and/or databases to which access have been granted.

The forms database 150 includes forms for creating data in the databases, such as a server definition form, an application definition form, an access definition form, an access request form, and a connection document form. The forms database 150 may also include other graphical user interfaces for facilitating access management by a database administrator. For each database or application on a server 130, the database administrator may create the appropriate data or profiles to be utilized by the access management system 100.

Usage of the access management system 100 may be restricted to database administrators who are included in an access control list 160 and authorized to manage user access. An access control list (ACL) is a table that tells a computer operating system which access privileges each user has to a particular system object, such as a file directory or an individual file. Each object has a security attribute that identifies its access control list. The ACL has an entry for each system user with access privileges. The most common privileges include the ability to read a file (or all the files in a directory), to write to the file or files, and to execute the file (if it is an executable file, or program). Each server system 130-1 to 130-n may also include an ACL 136-1 to 136-n which contains a list of users and respective access privileges.

Figure 2:
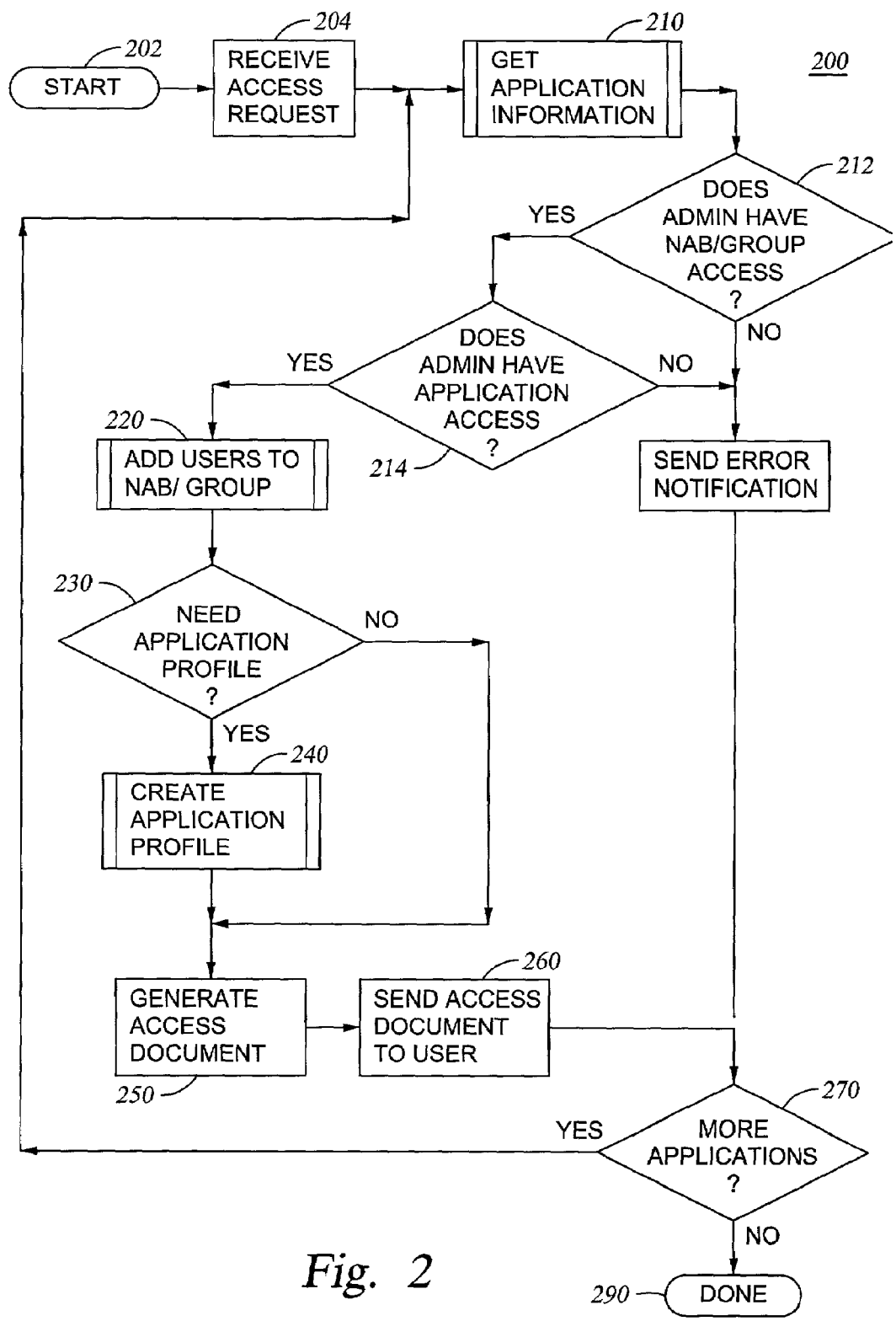
FIG. 2 is a flow chart illustrating one embodiment of a method 200 for managing user access to one or more databases.

FIG. 2 is a flow chart illustrating one embodiment of a method 200 for managing user access to one or more databases. The method 200 illustrates one embodiment of the access management program 118 as shown in FIG. 1. The method 200 starts at block 202 and waits for entry of an access request at block 204. In one embodiment, the access request may be prepared and entered by a database administrator or a person who has authority to grant access to the users. The database administrator may prepare the access request based on information provided from the users requesting access or a representative for the users. For example, a project manager for a group of programmers may send a notification (e.g., email) to the database administrator to request access for the group. The notification may include a list of users requesting access, a list of requested applications, and the types of access requested. The database administrator may also use blue pages to look up the users names (e.g., fully qualified Lotus Notes identifiers). The database administrator then enters or copies the information into an access request.

FIG. 3 is a graphical user interface illustrating one embodiment of an access request 300. In one embodiment, the access request 300 includes a users list 310 containing information regarding users requesting access, an applications list 320 containing information regarding the applications to which the users are requesting access, and an access type list 330 containing information regarding the type of access requested by the users for each requested application. Each application may present different types of access, such as, reader, author, administration, etc., depending on the type of application. The information contained in the access request may be submitted by the database administrator through a submission button or command in the graphical user interface.

Figure 4:
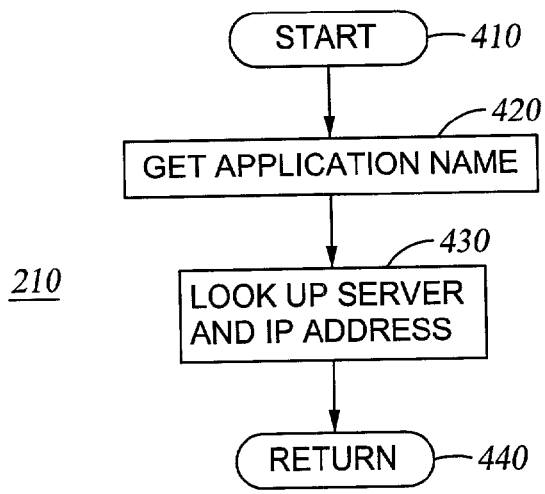
FIG. 4 is a flow chart illustrating one embodiment of a method 400 for obtaining application information.

After receiving the access request, the method 200 proceeds to block 210 to get application information for each requested application. FIG. 4 is a flow chart illustrating one embodiment of a method 400 for obtaining application information according to the processes performed in block 210. The method 400 starts at block 410 and proceed to block 420 to get the application name from the access request. The method 400 then proceeds to block 430 to look up the server name for the server on which the application resides and the IP address of the server. The method 400 then returns to the method 200 at block 440.

After retrieving the application information, the method 200 determines whether the database administrator processing this access request has the administration authority to change the NAB/group for the application at block 212. Groups may be located in the server's name and address book (NAB) or in a group manager called the public group manager. Examples of types of NAB includes a regular vanilla address book, a public group manager (under IBM's Global Notes Architecture (GNA)), etc. In one embodiment, the only people who can access the NAB/group are contained in an administrator list for the NAB/group, and the method 200 determines whether the database administrator processing this access request is on the administrator list for the NAB/group. If the database administrator is on the administrator list, then the method 200 proceeds to block 214. If the database administrator is not on the administrator list, then the method 200 proceeds to block 216 to send an error notification to the database administrator.

At block 214, the method 200 determines whether the database administrator processing this access request has authority to give users access to the application. In one embodiment, the method 200 queries the ACL for the application to determine whether the database administrator has authority to give users access to the application. If the database administrator does not have authority to give users access to the application, then the method 200 proceeds to block 216 to send an error notification to the database administrator. After sending the error notification at block 216, the method 200 proceeds to query whether there is another application on the access request that needs to be processed at block 270.

Figure 5:
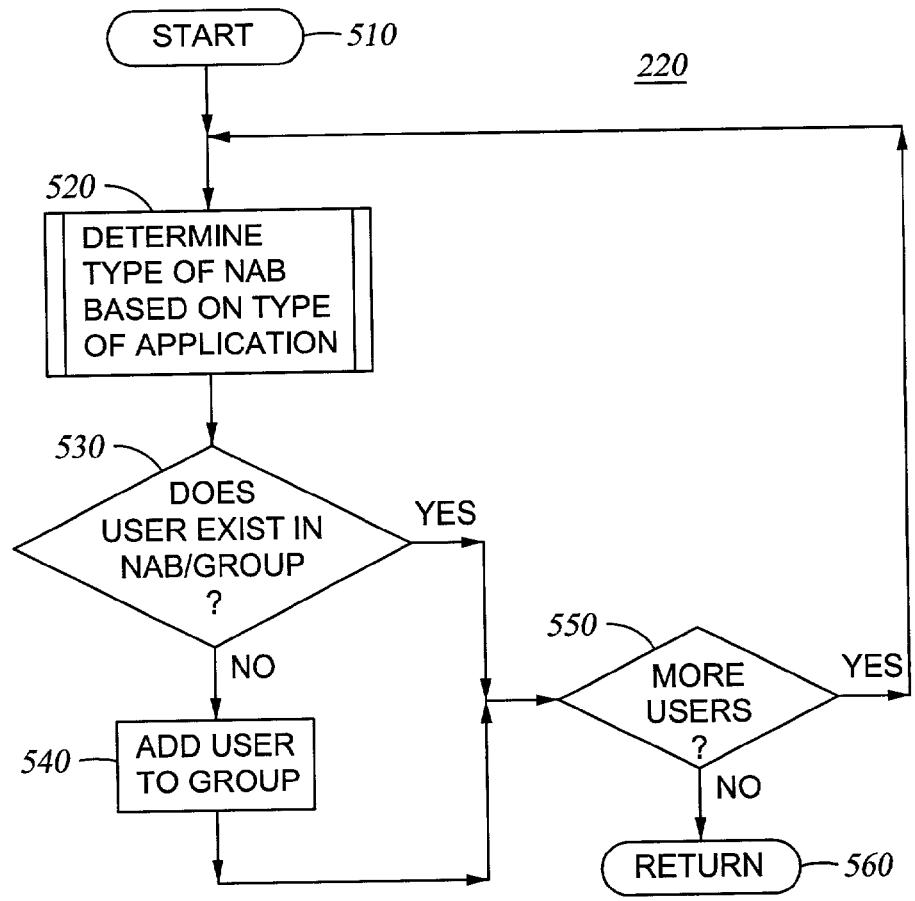
FIG. 5 is a flow chart illustrating one embodiment of a method 500 for adding users to NAB/group.

Referring back to block 214, if the database administrator has authority to give users access to the application, then the method 200 proceeds to block 220 to add users to the NAB/group. FIG. 5 is a flow chart illustrating one embodiment of a method 500 for adding users to NAB/group. The method 500 illustrates one embodiment of the processes performed in block 220. The method 500 begins at block 510 and proceeds to block 520 to determine the type of NAB based on the type of application. After determining the type of NAB, the method 500 queries whether the user already exists in the NAB at block 530. If the user does not exist in the NAB, the method 500 proceeds to block 540 to add the user to the group. The method 500 then proceeds to determine whether more users need to be processed at block 550.

Referring back to block 530, if the NAB already includes the user, then the method 500 proceeds to determine whether more users need to be processed at block 550. At block 550, if another user needs to be processed, the method 500 returns to block 530 to determine whether the next user exists in the NAB. After all users have been processed (i.e., no more users at query block 550), the method 500 ends and returns to the method 200 at block 560.

After all users have been added to the NAB/group, the method 200 determines whether an application profile is needed for each user at block 230. The method 200 may query the application definitions database 144 to determine the application profile requirements. In one embodiment, an application profile may comprise a user (or member) profile for each user of the application. Many special types of applications require user profiles for the users that have access to the application. The user profiles are documents that define the users and give demographics about the users. Thus, within the application, a database administrator can look up the members of this application and find other information such as phone numbers, etc. If application profiles are not needed for this application, then the method 200 proceeds to block 250 to generate an access document for each user. If an application profile is needed for each user, the method 200 proceeds to create an application profile for each user at block 240.

Figure 6:
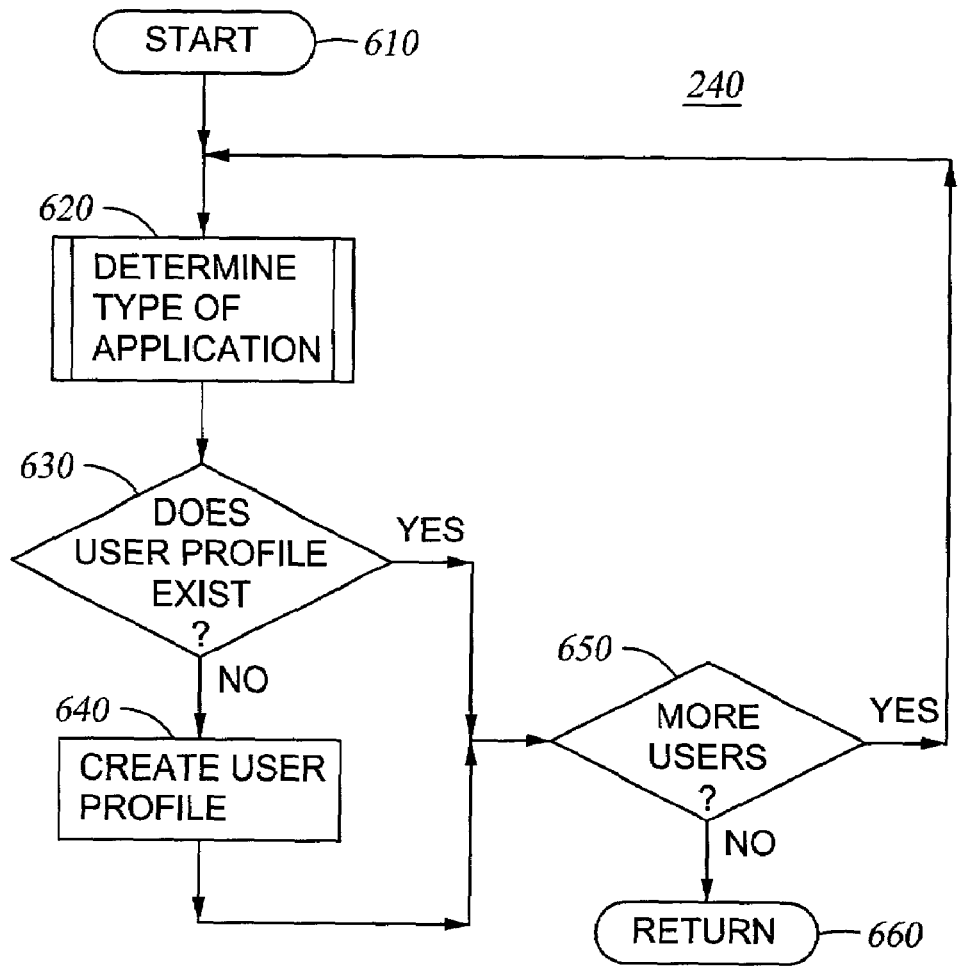
FIG. 6 is a flow chart illustrating one embodiment of a method 600 for creating application profiles.

FIG. 6 is a flow chart illustrating one embodiment of a method 600 for creating application profiles. The method 600 illustrates one embodiment of the processes performed in block 240. Other embodiments may be customized based on the application requirements for giving user access. The method 600 begins at block 610 and proceeds to block 620 to determine the type of application and the associated application profile requirements. The method 600 then determines whether a user profile exists for the application at block 630. If a user profile does not exist for the application, the method 600 creates a user profile for this user at block 640. The method 600 then proceeds to determine whether more users need to be processed at block 650. Referring back to block 630, if a user profile already exists for the application, the method 600 proceeds to determine whether more users need to be processed at block 650. At block 650, if another user needs to be processed, the method 600 returns to block 630 to determine whether a user profile exists for the next user. After all users have been processed (i.e., no more users at query block 650), the method 600 ends and returns to the method 200 at block 660.

After creating application profiles at block 240, the method 200 proceeds to block 250 to generate access documents for each user. At block 250, the method 200 generates an access document for each user to provide the necessary information for each user to begin accessing the application and/or databases. In one embodiment, the access document includes information regarding the time when access will become available to the user and the location (e.g., IP address) of the server to which the user has been granted access. The access document may also include an access button for creating a connection document to assist the user in making a connection to the server. The access button may be generated from data contained in the server definition database 142, the application definitions database 144 and the connection templates database 148. The connection document includes the necessary information for the user to make a connection to the server, including, for example, the following: the connection type, the server name and IP address, the location of the user, the user's access type, the usage priority, the port information (e.g., LAN port, TCP/IP port), the communication protocol (e.g., TCP/IP), and the direct address the network uses to look for and be routed to the database. The access document may also include dynamic application information such as the persons who provide support to the application and users.

FIG. 7 illustrates one embodiment of an access document 700. The access document includes a list of the users 710 who have been granted access, the database or application 720 to which access has been granted, the type of access 730 granted to the users, a note 740 informing the users the waiting period before access become available, an access button 750 which automates the connection procedure for the user to connect to the application/database, an explanation 760 of the manual procedure for the user to connect to the application/database, and a contacts list 770 listing the support personnel for accessing this application/database.

After generating the access document for each user, the method 200 sends the access document to each user (e.g., via email) at block 260. The user may follow instructions on the access document to set up and gain access to the applications and/or databases to which the user has been granted access. The method 200 then queries whether there is another application on the access request that needs to be processed at block 270. If another application needs to be processed, the method 200 returns to block 210 to process the access request for the next application. Referring back to block 270, if all requested applications have been processed, the method 200 ends at block 290.

The access management system 100 may also be utilized to track and manage user access. The access management system 100 may include a registry log (e.g., the access request database 146) which keeps information regarding the users who have been granted access, the time when access was granted, the database administrator who granted access, and other information which may help a database administrator to manage user access to a database.

While the foregoing is directed to embodiments of the present invention, other and further embodiments of the invention may be devised without departing from the basic scope thereof, and the scope thereof is determined by the claims that follow.

What is claimed is:

1. A computer-implemented method for managing user access to one or more databases, comprising:

receiving an access request for one or more users requesting access to one or more databases, wherein the access request is created and submitted by an administrator and wherein the access request comprises:

a users list containing information regarding each user requesting access;

an applications list containing information regarding respective one or more databases for which access is requested by each respective user listed in the users list; and an access type list containing information regarding respective types of access requested for each user listed in the users list;

in response to the received access request, retrieving server information for the one or more databases;

utilizing information provided in the access request, adding each user to a respective user group for each respective database for which access is requested for the respective user;

generating an access document for each user, the access document containing the server information for use in connecting to the respective one or more databases;

transmitting the respective access document to each user;

determining, for each respective database, whether a member profile is needed for each user requesting access to the respective database, wherein whether the member profile is needed is dependent on a configuration of the respective database; and if the member profile is needed, creating the member profile in the respective database for the respective user utilizing information provided in the access request.

2. The method of claim 1, wherein the document contains the server information in viewable form for use in manually connecting to the one or more databases.

3. The method of claim 1, further comprising,
determining a user group type for the respective database when adding the one or more users to the respective database.

4. The method of claim 3, further comprising,
before the adding step, verifying administration authority of a database administrator who processed the access request.

5. The method of claim 1, further comprising:
storing access requests and user access privileges.

6. The method of claim 1, wherein the access request specifies a plurality of types of access being requested.

7. The method of claim 1, wherein the server information includes a server name and an IP address.

8. The method of claim 1, further comprising:
providing a user interface for the administrator to enter information to create the access request.

9. The method of claim 1, wherein the access document includes an access button which automates creation of a connection document on a user/client system for connecting to a server using the server information.

10. A system for managing user access to one or more databases, comprising:
a storage device for storing one or more server definitions, one or more application definitions, one or more access definitions, and one or more access requests; and
a processor configured to:
receive an access request for one or more users requesting access to one or more databases, wherein the access request is created and submitted by an administrator and wherein the access request comprises:
a users list containing information regarding each user requesting access;
an applications list containing information regarding respective one or more databases for which access is requested by each respective user listed in the users list; and
an access type list containing information regarding respective types of access requested for each user listed in the users list;
in response to the received access request, retrieve server information for the one or more databases;
utilizing information provided in the access request, add each user to a respective user group for each respective database for which access is requested for the respective user;
generate an access document for each user, the access document containing the server information for use in connecting to the respective one or more databases; and
transmit the respective access document to each user,
wherein the processor is further configured to determine, for each respective database, whether a member profile is needed for each user requesting access to the respective database, wherein whether the member profile is needed is dependent on a configuration of the respective database, and if the member profile is needed, to create a member profile for each user of the database.

11. The system of claim 10, wherein the access document contains the server information in viewable form for use in manually connecting to the one or more databases.

12. The system of claim 10, wherein the processor is further configured to determine a user group type for the respective database when adding the one or more users to the respective database.

13. The system of claim 12, wherein the processor is further configured to verify administration authority of a database administrator who processed the access request before the adding step.

14. The system of claim 10, wherein the processor is further configured to store access requests and user access privileges.

15. A tangible signal bearing medium, comprising a program which, when executed by a processor, performs an operation for managing user access to one or more databases, the operation comprising:
receiving an access request for one or more users requesting access to one or more databases, wherein the access request is created and submitted by an administrator and wherein the access request comprises:
a users list containing information regarding each user requesting access;
an applications list containing information regarding respective one or more databases for which access is requested by each respective user listed in the users list; and
an access type list containing information regarding respective types of access requested for each user listed in the users list;
in response to the received access request, retrieving server information for the one or more databases;
utilizing information provided in the access request, adding each user to a respective user group for each respective database for which access is requested for the respective user;
generating an access document for each user, the access document containing the server information for use in connecting to the respective one or more databases;
transmitting the respective access document to each user;
determining, for each respective database, whether a member profile is needed for each user requesting access to the respective database, wherein whether the member profile is needed is dependent on a configuration of the respective database; and
if the member profile is needed, creating the member profile in the respective database for the respective user utilizing information provided in the access request.

16. The tangible signal bearing medium of claim 15, wherein the access document contains the server information in viewable form for use in manually connecting to the one or more databases.

17. The tangible signal bearing medium of claim 16, wherein the operation further comprises, before the adding step, verifying administration authority of a database administrator who processed the access request.

18. The tangible signal bearing medium of claim 15, wherein the operation further comprises determining a user group type for the respective database when adding the one or more users to the respective database.

19. The tangible signal bearing medium of claim 15, wherein the operation further comprises storing access requests and user access privileges.

20. The tangible signal bearing medium of claim 15, wherein the access request specifies a plurality of types of access being requested.

21. The tangible signal bearing medium of claim 15, wherein the server information includes server name and IP address.

22. The tangible signal bearing medium of claim 15, wherein the operation further comprises:
   providing a user interface for the administrator to enter information to create the access request.

23. The tangible signal bearing medium of claim 15, wherein the access document includes an access button which automates creation of a connection document on a user/client system for connecting to a server using the server information.

* * * * *